(12) United States Patent
Ayano et al.

(10) Patent No.: US 8,952,642 B2
(45) Date of Patent: Feb. 10, 2015

(54) POWER CONVERSION DEVICE AND TEMPERATURE RISE CALCULATION METHOD THEREOF

(75) Inventors: Hideki Ayano, Tokai (JP); Katsumi Ishikawa, Hitachinaka (JP); Kazutoshi Ogawa, Hitachi (JP); Tsutomu Kominami, Hitachinaka (JP); Mami Kunihiro, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 159 days.

(21) Appl. No.: 13/806,822

(22) PCT Filed: Jun. 23, 2011

(86) PCT No.: PCT/JP2011/064347
§ 371 (c)(1),
(2), (4) Date: Dec. 24, 2012

(87) PCT Pub. No.: WO2011/162318
PCT Pub. Date: Dec. 29, 2011

(65) Prior Publication Data
US 2013/0119912 A1      May 16, 2013

(30) Foreign Application Priority Data

Jun. 25, 2010   (JP) .................... 2010-144418

(51) Int. Cl.
*H02P 29/00* (2006.01)
*H02M 1/32* (2007.01)
*H02P 21/06* (2006.01)
*H02M 7/5387* (2007.01)

(52) U.S. Cl.
CPC ............. *H02P 29/0088* (2013.01); *H02M 1/32* (2013.01); *H02P 21/06* (2013.01); *H02M 2001/327* (2013.01); *H02M 7/5387* (2013.01)
USPC ............................ 318/472; 318/471; 318/445

(58) Field of Classification Search
CPC ................................................... H02P 29/0088
USPC ........................................ 318/472, 471, 445
See application file for complete search history.

(56) References Cited

U.S. PATENT DOCUMENTS 4,924,168 A * 5/1990 Horie et al. .................. 318/811
5,875,414 A   2/1999 Tsutsumi
(Continued)

FOREIGN PATENT DOCUMENTS

JP   7-135731 A   5/1995
JP   9-140155 A   5/1997
(Continued)

OTHER PUBLICATIONS

Corresponding International Search Report with English Translation dated Sep. 27, 2011 (four (4) pages).

*Primary Examiner* — David S Luo
(74) *Attorney, Agent, or Firm* — Crowell & Moring LLP

(57) ABSTRACT

Temperature rise in semiconductor switching element that is part of a power conversion device is estimated to assess the degradation and remaining lifetime of the switching element. This is accomplished with a heat generation amount calculation unit in a calculation processor, where current command values $Id^*$ and $Iq^*$ and voltage command values $vu^*$, $vv^*$ and $vw^*$ are used to calculate a chip loss. Current values $iu^*$, $iv^*$ and $iw^*$ of all output phases are estimated from the current command values. The ON/OFF loss of the chip is represented by a function of an estimated value for a current flowing in each output phase, and the loss can be derived by integration with a PWM carrier frequency f. With respect to a conduction loss, a conduction time is integrated with the estimated current value and a saturation voltage, which is a function of the estimated current value.

16 Claims, 10 Drawing Sheets

(56) References Cited

U.S. PATENT DOCUMENTS 6,121,736 A * 9/2000 Narazaki et al. ......... 318/400.35
2005/0071090 A1 3/2005 Katou

FOREIGN PATENT DOCUMENTS

| | | |
|---|---|---|
| JP | 9-233832 A | 9/1997 |
| JP | 11-255442 A | 9/1999 |
| JP | 2002-5989 A | 1/2002 |
| JP | 2002-101668 A | 4/2002 |
| JP | 2003-189668 A | 7/2003 |
| JP | 2005-168262 A | 6/2005 |
| JP | 2006-49411 A | 2/2006 |
| JP | 2006-81350 A | 3/2006 |
| JP | 2008-131722 A | 6/2008 |
| WO | WO 2004/082114 A1 | 9/2004 |

* cited by examiner

| Ic | Esw |
|---|---|
| 0.1 | 0.01 |
| ⋮ | ⋮ |
| ⋮ | ⋮ |
| 1 | 0.15 |
| ⋮ | ⋮ |
| ⋮ | ⋮ |
| 10 | 3 |
| ⋮ | ⋮ |
| ⋮ | ⋮ |
| 100 | 40 |
| ⋮ | ⋮ |

POWER CONVERSION DEVICE AND TEMPERATURE RISE CALCULATION METHOD THEREOF

FIELD OF THE INVENTION

The present invention relates to a power conversion device and the method of calculating a temperature rise caused by the power conversion device, and more particularly to a power conversion device that assesses the degradation and remaining lifetime of a semiconductor switching element used in the power conversion device and the method of calculating a temperature rise caused by the power conversion device.

BACKGROUND OF THE INVENTION

With the method of estimating the lifetime of a semiconductor device and a semiconductor power converter described in patent document (PD) 1, a temperature detector is connected to the base plate of an IGBT element of an inverter and the number of ripple temperatures is counted in each temperature range.

With the elevator controller described in patent document (PD) 2, a lifetime assessment method is not addressed, but a loss per chip is calculated from, for example, an output signal from a current detector to prevent the chip from causing a thermal runaway due to a junction temperature rise in an IGBT element.

PRIOR TECHNICAL DOCUMENT

Patent Document

{PD 1}
Japanese Patent Laid-Open No. 2002-101668
{PD 2}
Japanese Patent Laid-Open No. Hei 11 (1999)-255442

SUMMARY OF THE INVENTION

When the structure disclosed in PD 1 is used, a temperature detector needs to be connected to the base plate. In practice, however, the temperature detector needs to be connected to a place immediately below the chip. When the temperature detector is connected particularly to a cooling device such as a heat dissipating fin, therefore, the base plate or cooling device needs to be machined so that the cooling device is wired to the temperature detector. When deterioration of the chip in each phase is assessed, temperature sensors need to be provided at places immediately below all chips. This may result in a complex mounting structure.

When the structure disclosed in PD 2 is used, a loss per chip needs to be calculated from a detected current value obtained from a current detector and the pulse width of a voltage obtained by detecting an edge of a voltage pulse command.

When deterioration of the chip in each phase is assessed in this method, however, at least a means for detecting a pulse edge in each phase is required. A mechanism is also required that reads an instantaneous current by using a signal that fetches the pulse edge as a trigger, so a dedicated A/D converter or the like is required and thereby the device may become complex.

An object of the present invention is to provide a power conversion device that can calculate a temperature rise with a simple method or to provide a method of calculating a temperature rise caused in the power conversion device.

In one aspect, the present invention is characterized by being having a means for estimating a current value in each output phase from a current command value in each control cycle in which a switching element is controlled so that the switching element is turned on or off, a means for calculating an ON loss and an OFF loss of the switching element as a function of the estimated current value, a means for determining a switching element to be brought into conduction according to a polarity of the current command value, a means for calculating, from the voltage command value in each output phase, a conduction time of the switching element in the each output phase in a control cycle, a means for calculating a conduction loss of the switching element from the current value and the conduction time, and a means for calculating an amount of heat generated by the switching element from the ON loss and the OFF loss of the switching element and the conduction loss of the switching element.

In a preferred embodiment of the present invention, a chip loss is calculated in a calculation processor by using a current command value and a voltage command value. First, a current value in each output phase is estimated from the current command value. The ON loss and OFF loss of the chip can be represented as a function of an estimated value of a current flowing in the each output phase, and can be derived by integration with a carrier frequency set in the calculation processor. With respect to a conduction loss, it is necessary to integrate a conduction time with the estimated current value and a saturation voltage, which is a function of the estimated current value. In this case, the conduction time is calculated from a relationship between a carrier amplitude and the voltage command value in each control cycle of the inverter. An IGBT loss and a diode loss can also be determined from the sign of the current command value. In addition, an ambient temperature sensor can be added to calculate an absolute temperature.

According to the preferred embodiment of the present invention, a temperature rise caused in a power conversion device can be calculated with a simple method in which a current command value and a voltage command value, that is, only the internal information in a calculation processor, are used, so the present invention can be applied to, for example, the assessment of element deterioration.

DESCRIPTION OF THE PREFERRED EMBODIMENTS

Embodiments of the present invention will be described with reference to the drawings.

Embodiment 1

Figure 1:
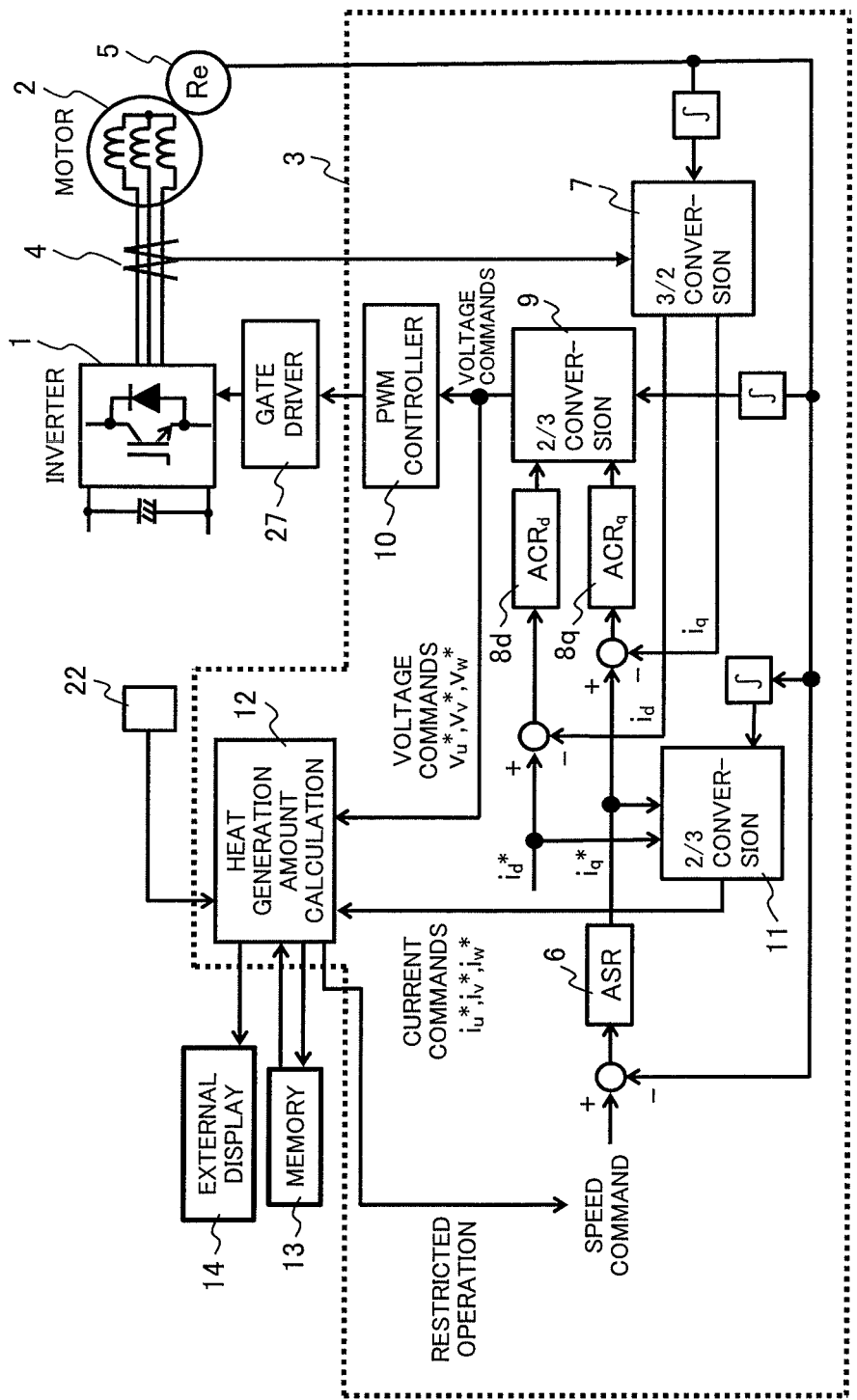
FIG. 1 schematically shows the entire structure of a power conversion device in a first embodiment of the present invention.

FIG. 1 schematically shows the entire structure of a power conversion device in a first embodiment of the present invention.

As a main circuit, the power conversion device includes an inverter main circuit 1 and a motor 2 that is powered and driven by the inverter main circuit 1.

As a controller, the power conversion device includes a control circuit 3 that performs calculations to control the inverter main circuit 1 and calculates the amount of heat generated in the inverter main circuit 1, a current detector 4 that is used as a sensor to detect a current output from the inverter main circuit 1 to the motor 2, and a rotary encoder 5 that detects the magnetic pole position of the motor 2 and its rotational speed.

In this embodiment, the control circuit 3 has a heat generation amount calculation unit 12 that calculates the amount of heat generated at the chip of a switching element in the inverter main circuit 1 from a command value used in calculation in a control and calculation unit, a storage unit 13 that stores information about the amount of generated heat, which has been calculated by the heat generation amount calculation unit 12, and information about element deterioration, which is calculated from the information about the amount of generated heat, and an external storage unit 14 that displays a warning according to the information about the calculation of the amount of generated heat and the history of generated heat.

The structure of a control system in the control circuit 3 is such that a difference between a speed command and the rotational speed of the motor 2, which is obtained from the rotary encoder 5, is input to a speed control system 6 and a torque current command value iq* is output to have the rotational speed of the motor 2 follow the speed command. Furthermore, current signals, obtained from the current detector 4, in all phases (u, v and w phases) in a fixed coordinate system are converted to signals id and iq in a rotational coordinate system (d and q phases) by a 3-phase/2-phase converter 7. The d axis and q axis in the rotational coordinate system are mutually orthogonal; usually, the d axis handles the field component of the motor and the q axis handles the torque component of the motor. That is, in control of the motor 2, when the fixed coordinate system is converted to the rotational coordinate system, the field and torque can be controlled independently. Differences in the current signals Id and Iq in the rotational coordinate system are respectively input to a d-axis current control system 8d and a q-axis current control system 8q so that the current signals Id and Iq respectively follow the current command values Id* and Iq*. Furthermore, voltage commands, which are output results, in the rotational coordinate system are input to a 2-phase/3-phase converter 9 to convert them to three-phase voltage commands in the fixed coordinate system. Then, a PWM controller 10 generates an ON/OFF control signal according to the result of comparison between a triangular wave carrier and a voltage command value. The ON/OFF control signal controls the relevant switching element in the inverter main circuit 1 through a gate driver 27 so that the switching element is turned on or off.

In the first embodiment, the heat generation amount calculation unit 12 in the control circuit 3 uses only a control command value as an input factor to calculate the amount of heat generated at the chip from an instantaneous value, and performs a deterioration calculation.

Thus, since the measurement of the chip temperature and the like does not require a temperature sensor to be embedded in the element and a means for measuring a pulse width, a temperature rise in the switching element in the inverter 1 and deterioration based on the temperature rise can be assessed in an extremely simple manner.

Next, the method of calculating the amount of generated heat from the command value in the heat generation amount calculation unit 12 to will be described.

In the calculation of the amount of generated heat, voltage command values vu*, vv* and vw* in the fixed coordinate system and current command values iu*, iv*, and iw* in the fixed coordinate system are used. The current command values iu*, iv* and iw* in the fixed coordinate system can be obtained by entering the current command values id* and Iq* in the rotational coordinate system into a current command 2-phase/3-phase converting unit 11 and by solving the equation below.

{Math 1}

$$\begin{bmatrix} iu* \\ iv* \\ iw* \end{bmatrix} = K \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta m & \sin\theta m \\ \sin\theta m & \cos\theta m \end{bmatrix} \begin{bmatrix} id* \\ iq* \end{bmatrix} \quad (1)$$

In the above equation, θm is the magnetic pole position of the motor 2, the magnetic pole position being obtained by the rotary encoder 5, and K is a coefficient used in conversion from the rotational coordinate system to the fixed coordinate system. The current command values iu*, iv* and iw*, obtained from the above equation, in the fixed coordinate system and the voltage command values vu*, vv* and vw* in the fixed coordinate system are used to calculate the switching element loss as an instantaneous value by a method described below. The calculated switching element loss is used to calculate the temperature of the element.

Figure 2:
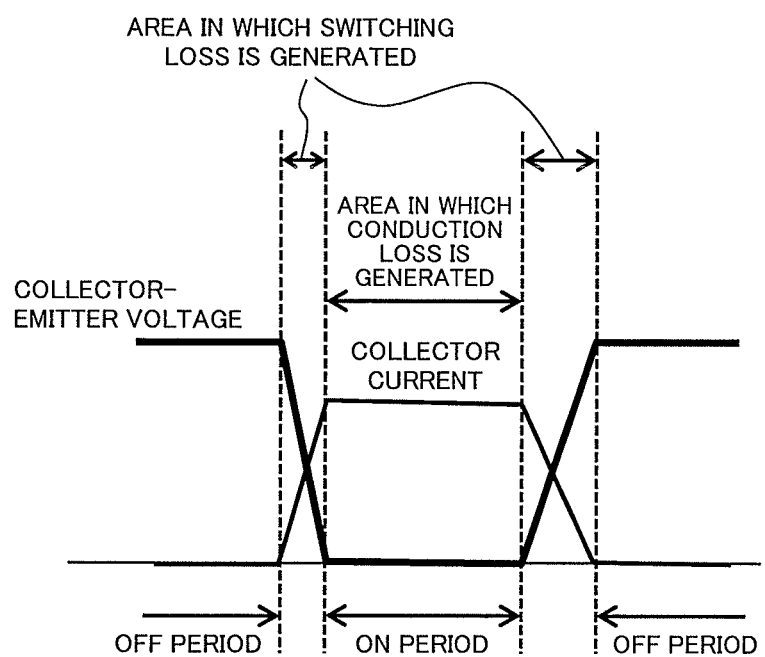
FIG. 2 illustrates a relationship between the ON and OFF states of a switching element and a loss generated in these states.

FIG. 2 illustrates a relationship between the ON and OFF states of a single switching element and a loss generated in the element. The loss generated in the element is represented by the equation below.

$$\text{Loss in element}=\text{switching loss}+\text{conduction loss} \quad (2)$$

The switching loss is the ON loss that is generated when the switching element changes from the OFF state to the ON state or the OFF loss that is generated when the switching element changes from the ON state to the OFF state. The ON loss and OFF loss are each generated once in one switching cycle (carrier cycle). Therefore, the switching loss is represented by the equation below.

{Math 2}

$$\text{Switching loss}=f_{sw}\times(\text{ON loss}(Esw\_on)+\text{OFF loss}(Esw\_off)) \quad (3)$$

In the equation above, fsw is a switching frequency. The ON loss (Esw_on) and OFF loss (Esw_off) are each a function that indicates the magnitude of a collector current Ic that flows in the collector of the element, as described below.

Figures 3, 4:
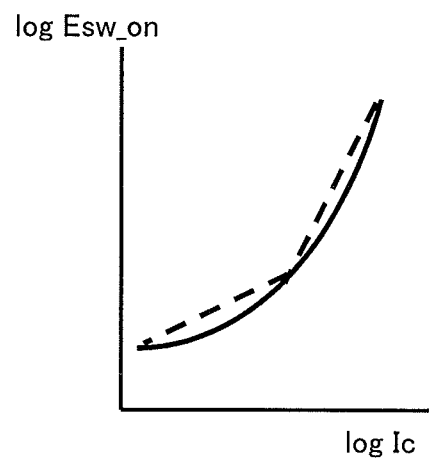
FIG. 3 illustrates a relationship between the collector current of the switching element and its ON loss.
FIG. 4 is an example of a data table of the ON loss caused by the collector current.

FIG. 3 illustrates a relationship between the collector current and the ON loss (Esw_on). The ON loss (Esw_on) is as indicated by the solid line in FIG. 3, and is represented by using, for example, a cubic polynomial as in equation (4) below.

{Math 3}

$$Esw\_on = a \cdot Ic^3 + b \cdot Ic^2 + c \cdot Ic + d \quad (4)$$

In the above equation, coefficients a, b, c and d are constant values. While the switching element is being brought into conduction, the instantaneous value of the collector current Ic is a value equal to the current command value iu*, iv* or iw* in the fixed coordinate system in the corresponding phase. While the switching element is not being brought into conduction, the instantaneous value of the collector current Ic can be regarded as zero. In the first embodiment, these coefficients can be stored in the heat generation amount calculation unit 12 or storage unit 13 in advance, and the ON loss can be calculated by assigning an instantaneous current command value in the fixed coordinate system to equation (4) in each switching cycle. Alternatively, the ON loss may be calculated by an approximation to a linear expression in each current segment, as indicated by the dashed lines in FIG. 3. In this case, an advantageous effect of reducing a calculation load is obtained. A table value of the ON loss caused by the collector current may be stored in the heat generation amount calculation unit 12 or storage unit 13 in advance and may be read at an appropriate time.

FIG. 4 is an example of a table of the ON loss caused by the collector current. For example, when a value corresponding to an instantaneous collector current is read in each switching cycle, the ON loss can be quickly derived accurately.

As with the ON loss (Esw_on), the OFF loss (Esw_off) can be derived by using equation (4).

Similarly, the recovery loss of a diode, which is included in the ON loss (Esw_on), is represented as in the equation below.

{Math 4}

$$\text{Recovery loss}=f_{sw}\times\text{recovery loss}(Err)\text{per switching} \quad (5)$$

The recovery loss (Err) per switching is also a function value of the collector current Ic. Accordingly, the recovery loss can be derived in a similar way to the ON loss.

Next, the method of calculating the conduction loss will be described. The conduction loss of the switching element is a loss generated when a current flows in the switching element while it is being brought into conduction. In general, the conduction loss Rcs of the switching element is represented as in the equation below.

{Math 5}

$$Rcs=\text{emitter-collector saturation voltage}(Vce(sat))\times \text{root-mean-square value of collector current} \quad (6)$$

Similarly, the conduction loss Rcd of the diode is represented as in the equation below.

{Math 6}

$$Rcd=\text{emitter-collector saturation voltage}(Vce(sat))\times \text{root-mean-square value of collector reverse current} \quad (7)$$

If the motor 2 is a synchronous motor, particularly when it is being operated at extremely low speed or is being accelerated, current concentrates on a particular element or a current amplitude rapidly changes. This makes it difficult to calculate an accurate root-mean-square value of the current. Accordingly, error in the values calculated by using equations (6) and (7) becomes large.

In the first embodiment, therefore, a new method of calculating an instantaneous loss is used in which sequential calculation is performed for the conduction loss as well by using a command value in each cycle. In particular, the conduction loss is calculated from the direction of a phase current and the conduction width (duty ratio) of the period of one cycle.

FIG. 5 illustrates a relationship between current directions and elements that are brought into conduction in the switching element.

The drawing illustrates a model of an element for one output phase. A switching element IGBTp on the positive pole side and a switching element IGBTn on the negative pole side are connected in series. A load is connected at an intermediate point between these switching elements. A diode Dp is connected to the switching element IGBTp in parallel, and a diode Dn is connected in parallel with the switching element IGBTn.

Figure 5A:
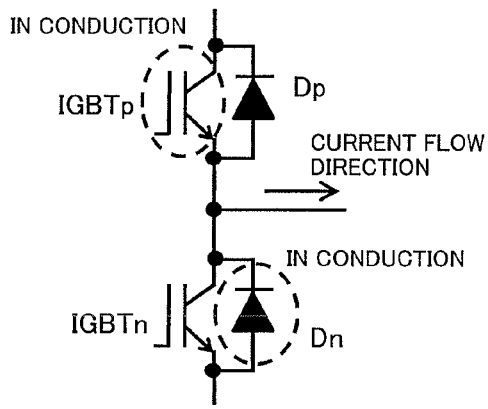
FIG. 5 illustrates a relationship between a current direction and elements that are brought into conduction in the switching element.
Figure 5B:
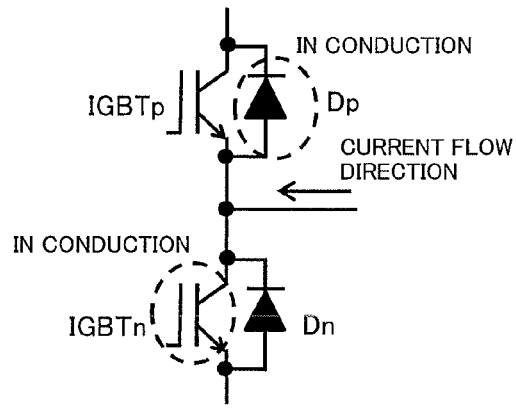

In FIG. 5, when a current flows from the element toward the load, the current is regarded as positive. When the output current is positive, the switching element IGBTp on the positive pole side and the diode Dn on the negative pole side are brought into conduction, as illustrated in FIG. 5(a). When the current is negative, the switching element IGBTn on the negative pole side and the diode Dp on the positive pole side are brought into conduction as illustrated in FIG. 5(b). When the output current is positive, the sign of the current command value iu*, iv* or iw* in the corresponding phase is also positive; when the output current is positive, the sign of the current command value iu*, iv* or iw* in the corresponding phase is also negative.

Figure 6:
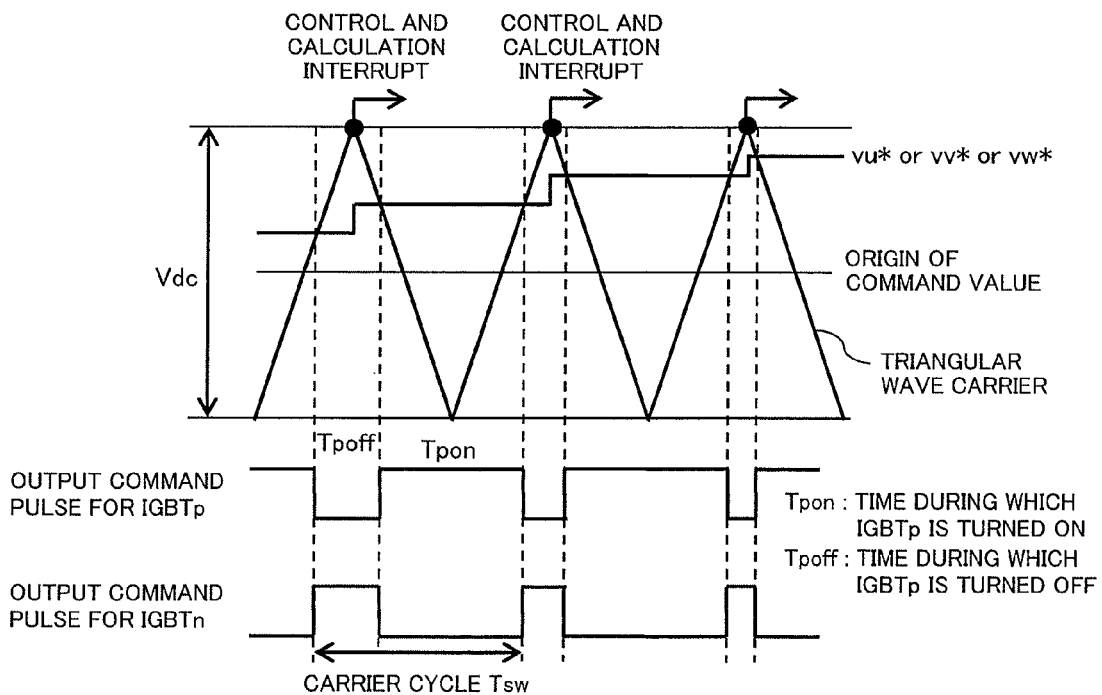
FIG. 6 illustrates a relationship in PWM control between a voltage command value and a period during which the switching element is brought into conduction.

FIG. 6 illustrates a relationship in PWM control between a voltage command value and a period during which the switching element is brought into conduction. When the output command pulse in FIG. 6 is noted, the command pulse for the output voltage from the switching element IGBTp on the positive pole side and the command pulse for the output voltage from the switching element IGBTn on the negative pole side are mutually inverted commands. A relationship between the pulse of the output voltage and the output current command value is such that when the output current command illustrated in FIG. 5(a) is positive, a current flows in the switching element IGBTp on the positive pole side in the segment Tpon and a current flows in the diode Dn on the negative pole side in the segment Tpoff. Similarly, when the output current command illustrated in FIG. 5(b) is negative, a current flows in the diode Dp on the positive pole side in the segment Tpon and a current flows in the IGBTn on the negative pole side in the segment Tpoff.

As seen from FIG. 6, the ratio of Tpon to the switching cycle Tsw and the ratio of Tpoff to switching cycle Tsw are determined according to the relationship between the size of the triangular wave carrier and the voltage command value vu*, vv* or vw*. In general, when the amplitude and switching cycle of the triangular wave carrier, which is a DC voltage value of a DC link, are respectively denoted by Vdc and Tsw, the above ratios are represented as in equations (8) and (9).

{Math 7}

$$\frac{Tpon}{Tsw} = \left((vu*, vv*, vw*) + \frac{Vdc}{2}\right) \Big/ Vdc \quad (8)$$

{Math 8}

$$\frac{Tpoff}{Tsw} = 1 - \frac{Tpon}{Tsw} \quad (9)$$

That is, the ratios can be calculated from the voltage command value vu*, vv* or vw*.

The loss of each element in one cycle Tsw is calculated by, for example, generating a control and calculation interrupt at the vertex of each triangular wave carrier and then using a command value (instantaneous value) at that time, as illustrated in FIG. 6, as part of control and calculation processing by an ordinary inverter. That is, since the loss is calculated in synchronization with control and calculation interrupt processing by the inverter, highly precious calculation is possible. This is because since the command value is updated in an interrupt cycle, even if calculation is performed in a cycle shorter than the interrupt cycle, the calculation result remains unchanged.

When the output current command is positive, equations (10) and (11) hold.

{Math 9}

$$\Delta P_{IGBTp} = Esw\_on + Esw\_off + \\ Vce(sat) \times \text{current command value} \times \frac{Tpon}{Tsw} \times Tsw \quad (10)$$

{Math 10}

$$\Delta P_{Dp} = Err + Vec(sat) \times \text{current command} \times \frac{Tpoff}{Tsw} \times Tsw \quad (11)$$

When the output current command is negative, equations (12) and (13) hold.

{Math 11}

$$\Delta P_{IGBTn} = Esw\_on + Esw\_off + \\ Vce(sat) \times \text{current command value} \times \frac{Tpoff}{Tsw} \times Tsw \quad (12)$$

{Math 12}

$$\Delta P_{Dn} = Err + Vec(sat) \times \text{current command} \times \frac{Tpon}{Tsw} \times Tsw \quad (13)$$

Accordingly, when the output current command is positive, the instantaneous loss of each element is represented as in equation (14) or (15).

{Math 13}

$$\Delta P_{Dn} = Err + Vec(sat) \times \text{current command} \times \frac{Tpon}{Tsw} \times Tsw \quad (14)$$

{Math 14}

$$P_{Dp} = \sum \Delta P_{Dp} = Err \times fsw + Vec(sat) \times \text{current command} \times \frac{Tpoff}{Tsw} \quad (15)$$

When the output current command is negative, the instantaneous loss of each element is derived from equation (16) or (17).

{Math 15}

$$P_{IGBTn} = \sum \Delta P_{IGBTn} = (Esw\_on + Esw\_off) \times fsw + \\ Vec(sat) \times \text{current command} \times \frac{Tpoff}{Tsw} \quad (16)$$

{Math 16}

$$P_{Dn} = \sum \Delta P_{Dn} = Err \times fsw + Vec(sat) \times \text{current command} \times \frac{Tpon}{Tsw} \quad (17)$$

As with the ON loss, the collector-emitter saturation voltage Vce(sat) and emitter-collector saturation voltage Vec(sat) can be calculated as functions depending on the collector current Ic, that is, functions depending on current command value iu*, iv* or iw*. That is, as with the ON loss, the collector-emitter saturation voltage Vce(sat) and emitter-collector saturation voltage Vec(sat) can be derived through a numerical calculation or a reference to a table.

Accordingly, the conduction loss can also be calculated from the voltage command value and current command value.

Figure 7:
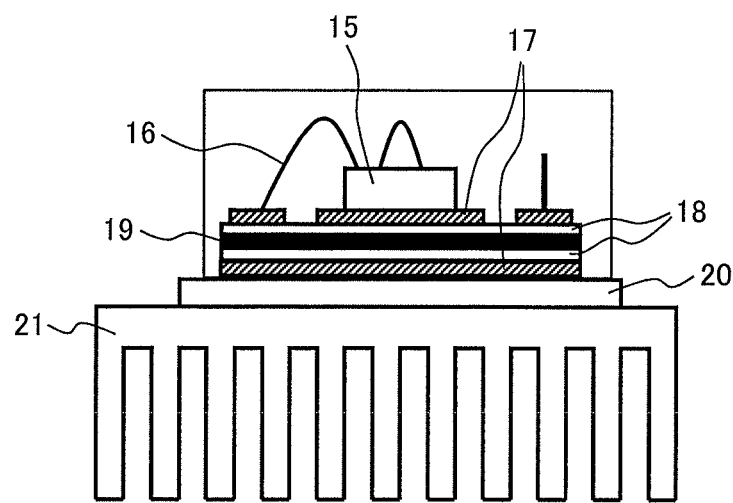
FIG. 7 is an example of a cross sectional view of a semiconductor switching element that is part of the power conversion device.

FIG. 7 is a cross sectional view of a semiconductor switching element that is part of the power conversion device. A chip 15, which is a semiconductor, is connected to a substrate consisting of conductive parts 18 and an insulator 19 through a wire 16 with a solder layer 17 interposed therebetween. The substrate is connected to a cooling unit 21 through another solder layer 17 and a base plate 20. When the temperature is raised due to generated heat, the solder layer 17 and conductive parts 18 expand. When the temperature is lowered, they contact. When the expansion and contract are repeated, the solder layer 17 is detached at the place where the wire 16 is connected. In addition, since the solder layer 17 has a different thermal expansion coefficient from the conductive part 18 and base plate 20, when the temperature rises, a stress is generated. If this stress is repeatedly generated, cracks occur at a solder part (lower solder layer) between the substrate and the base plate 20. These deteriorations exponentially progress with respect to the temperature rise variation (change) as indicated by a relationship, illustrated in FIG. 11, between temperature changes and the number of cycles to the lifetime.

Figure 8:
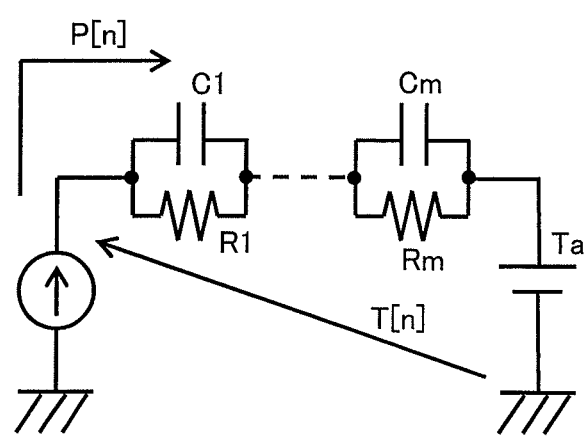
FIG. 8 illustrates a circuit model used for assessing the amount of generated heat.

FIG. 8 illustrates a circuit model used for assessing the amount of generated heat. A relationship between the amount of loss and temperature can be assessed by using a circuit model as illustrated in the drawing. That is, when the amount P[n] of loss, which is equivalent to a heat source, is given to a transient heat impedance model of an element cooling unit, temperature T[n] can be derived. Ta, which indicates ambient temperature, is added to a temperature rise caused by the amount P[n] of generated heat as an offset. The transient heat impedance model of the element cooling unit can be represented in combination with a thermal circuit model based on a CR circuit in which a thermal resistive component R and a thermal capacitive component C are used, as illustrated in FIG. 8. With a CR circuit with one parallel arrangement, equation (18) below holds.

{Math 17}

$$C \cdot \frac{\Delta T[n]}{\Delta tc} = P[n-1] - \frac{T[n-1]}{R} \quad (18)$$

In the above equation, Δtc represents a control cycle. In the case of FIG. 6, Δtc is equivalent to the switching cycle Tsw, which is a cycle of a control and calculation interrupt. Equation (18) can be expanded as equation (19), where temperature T[n] can be calculated.

{Math 18}

$$C \cdot \frac{T[n] - T[n-1]}{\Delta tc} = P[n-1] - \frac{T[n-1]}{R} \quad (19)$$

$$T[n] - T[n-1] = \frac{\Delta tc}{C} \cdot P[n-1] - \frac{\Delta tc}{CR} \cdot T[n-1]$$

$$T[n] = \frac{\Delta tc}{C} \cdot P[n-1] + \left(1 - \frac{\Delta tc}{CR}\right) \cdot T[n-1]$$

In the first embodiment, calculation with equation (19) based on the CR circuit model corresponding to the element is also performed in the heat generation amount calculation unit 12. Temperature information, which is a calculation result, is stored in the storage unit 13.

When calculation is performed in a form in which the CR circuit is connected in series as necessary as illustrated in FIG. 8, the transient heat impedance of the element and cooling unit can be simulated in more detail and precision with which the temperature of generated heat is calculated can be improved.

Figure 9:
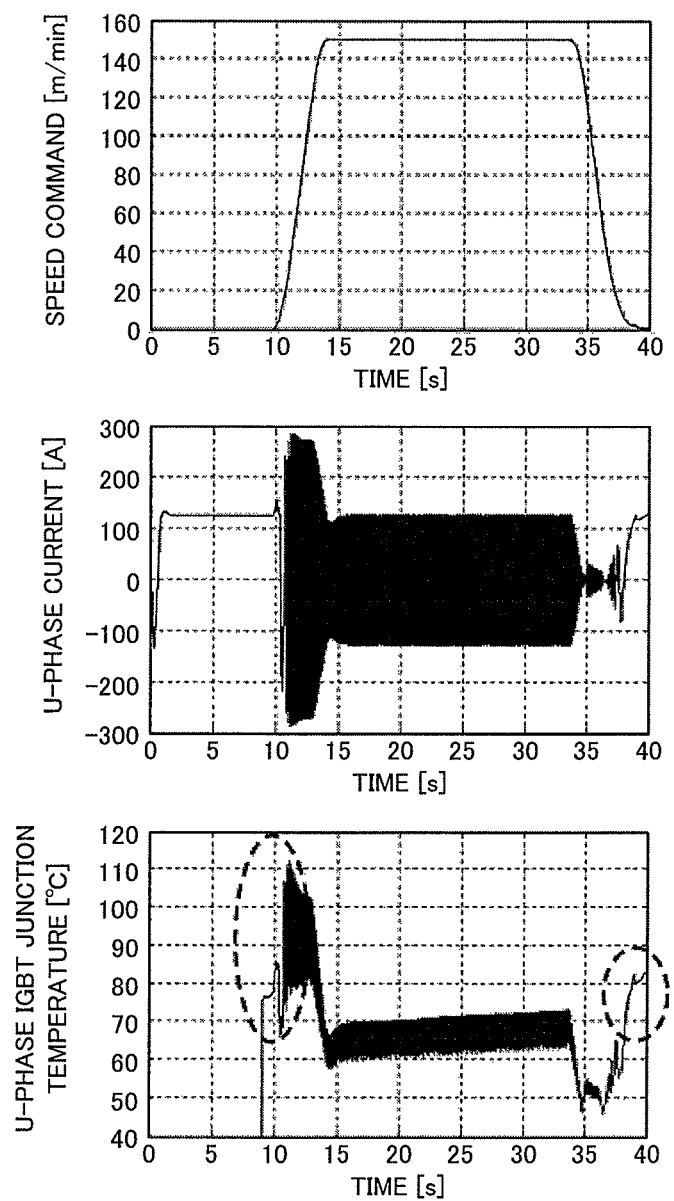
FIG. 9 illustrates results of a simulation in which the temperature of the chip (at a junction of a wire) in the semiconductor switching element was calculated according to the first embodiment of the present invention.

FIG. 9 illustrates results of a simulation in which the temperature of the chip (at the junction of the wire) in the semiconductor switching element was calculated according to the first embodiment of the present invention. In this simulation, a model in which an inverter was driven with a permanent magnet motor connected as a load was used.

It is found from FIG. 9 that temperature was raised not only in a segment in which current during acceleration was large but also in extremely low speed segments at the times of activation and stopping as indicated by a dashed line. This is because current concentrates on a particular element at the times of activation and stopping and the transient heat impedance becomes large in a low-speed segment. Accordingly, there is an advantageous effect that when an instantaneous loss is calculated from a command value in each control cycle Δtc as in the first embodiment, operations at low speed can be well simulated.

Figure 10:
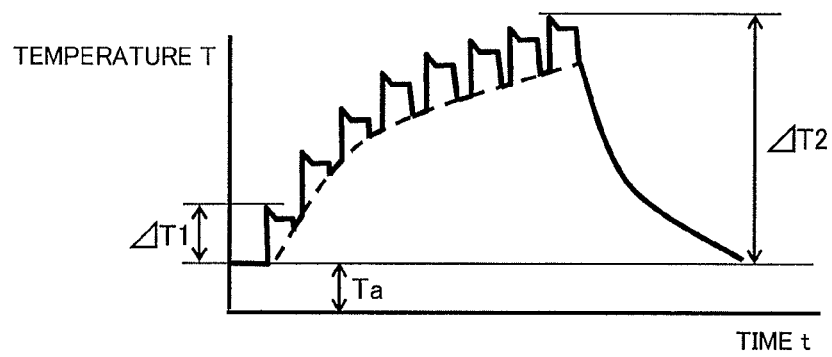
FIG. 10 schematically shows the junction temperature of the semiconductor switching element during continuous operation.

FIG. 10 schematically shows the junction temperature of the semiconductor switching element during continuous operation. In general, temperature during continuous operation tends to rise. As the number of continuous operations is rised, the temperature is saturated. This is because since the thermal time constant of the cooling unit is low, sufficient time is taken until saturation is reached. As for element deterioration, not only the amount of temperature change ΔT1 in one operation but also the amount of temperature change ΔT2 caused by continuous operation must be considered.

Figure 11:
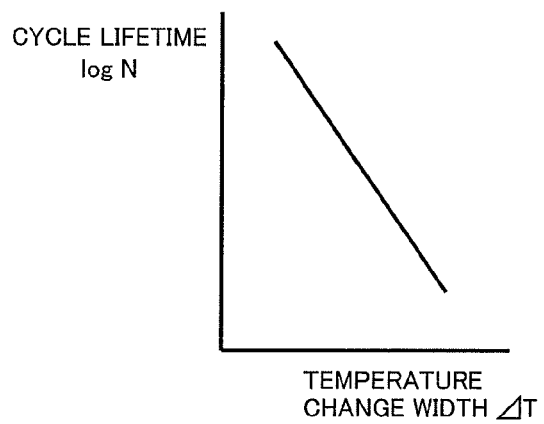
FIG. 11 schematically shows a relationship between temperature changes and the number of cycles to the lifetime of the semiconductor switching element.

FIG. 11 schematically shows a relationship between temperature changes and the lifetime of the semiconductor switching element. In the relationship of the lifetime (number of heat cycles) to temperature changes, the lifetime exponentially progresses with respect to the temperature change as illustrated in FIG. 11. Accordingly, it is necessary to consider both a component that causes a small amount of temperature change but appears frequently as with ΔT1 in FIG. 10 and a component that appears less frequently but causes a large amount of temperature change as with ΔT2.

In the first embodiment, since temperature is calculated in the heat generation amount calculation unit 12 in succession in each control cycle Δtc, the temperature rise of the element can be easily calculated, and since that temperature rise is stored in the storage unit 13, the remaining lifetime can be estimated. That the remaining lifetime is displayed on the external display unit 14 is very useful for a maintenance person who carries out periodic inspection.

Alternatively, the remaining lifetime may be estimated by having the heat generation amount calculation unit 12 calculate an effectually consumed life from the waveform in continuous operation and storing the calculation result in the storage unit 13. In this case, it suffices to store only the effectually consumed lifetime, so the storage capacity can be reduced.

In the first embodiment in FIG. 1, if it is predicted that temperature will exceed a prescribed value or the remaining lifetime became smaller than a prescribed value, a message is displayed on the external display unit 14 to prompt an action, repair, or replacement.

As described above, since information is given to the user before a destruction occurs, it becomes possible to prevent the driving of the inverter from being suspended due to an unintended destruction of an element. Another effect is to prevent secondary damage, such as a burnt wire, that would otherwise be caused when, for example, a shortcircuit mode is entered at the occurrence of the destruction.

If the remaining lifetime falls below the prescribed value, the operation speed or acceleration or deceleration can be limited. In this case, a first-aid life-sustaining action can be taken to prevent the element from being destructed due to an expired lifetime. This results in, for example, an advantageous effect of assuring a time margin even in a case in which urgent replacement is not possible.

Although, in the descriptions with reference to FIGS. 9 and 10, the temperature at the junction of the chip in the semiconductor switching element was calculated, it will be appreciated that the temperature of the semiconductor layer between the substrate and the base plate 20 may be calculated and the element lifetime, which depends on solder cracks and the like, may be estimated from changes in the calculated temperature.

Furthermore, temperature may be calculated for a particular element, for example, only the V phase out of the output phases. This results in an advantageous effect of reducing the calculation load and also reduces the storage capacity required to store information.

Next, an example in which a temperature sensor 22 has been attached to grasp the ambient temperature Ta in FIG. 8 or FIG. 10 will be described. When the power conversion device is used in a room or the like, in which the usage temperature condition is constant, temperature may be calculated without using a temperature sensor by giving a fixed value as Ta in the calculation of the temperature.

If, however, the temperature environment is severe, such as when temperature during the day and temperature at night largely differ in an outdoor environment in a cold area, Ta changes like ΔT2 and thereby the number of cycles to the lifetime is affected, even if continuous operation as in FIG. 10 is not performed. Accordingly, in the first embodiment, a temperature sensor 22 that measures ambient temperature rather than inter-module temperature in the element is attached.

This will make it possible to calculate the absolute temperature of the chip in the element module with a mere addition of a very simple temperature sensor.

Figure 12:
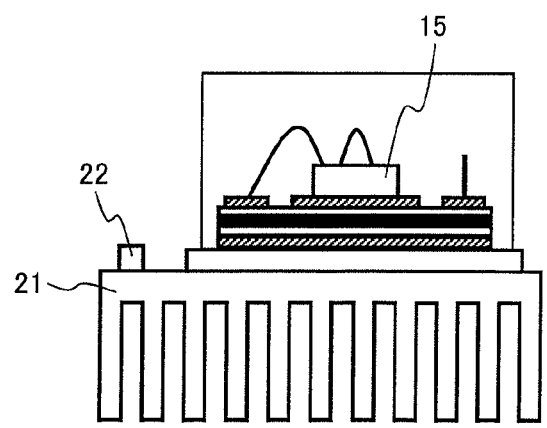
FIG. 12 is a first example of the placement of a temperature sensor in the first embodiment of the present invention.

FIG. 12 is a first example of the placement of a temperature sensor in the first embodiment of the present invention. In FIG. 12, the temperature sensor 22 is placed on the cooling unit 21. Especially if a plurality of element modules are mounted, thermal interference or another adverse effect may be received. However, the cooling unit 21 does not need to be considered as the element of the transient thermal impedance in FIG. 8, so an advantageous effect of simplifying calculation is obtained.

In this case, if the cooling unit 21 has a large thermal capacity as with a water cooling system and causes less heat changes, an advantageous effect of alleviating an adverse effect of thermal interference with other modules is obtained.

Figure 13:
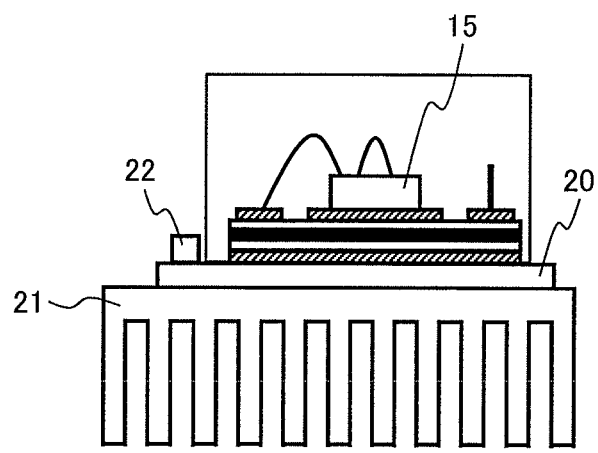
FIG. 13 is a second example of the placement of the temperature sensor in the first embodiment of the present invention.

FIG. 13 is a second example of the placement of the temperature sensor in the first embodiment of the present invention. In FIG. 13, the temperature sensor 22 is placed on the base plate 20 of the element. In this example as well, the cooling unit 21 does not need to be considered as the element of the transient thermal impedance as in the first example of the placement of the temperature sensor in FIG. 12, so an advantageous effect of simplifying calculation is obtained. Another advantageous effect in this example is that thermal interference with other modules is not received easily.

Figure 14:
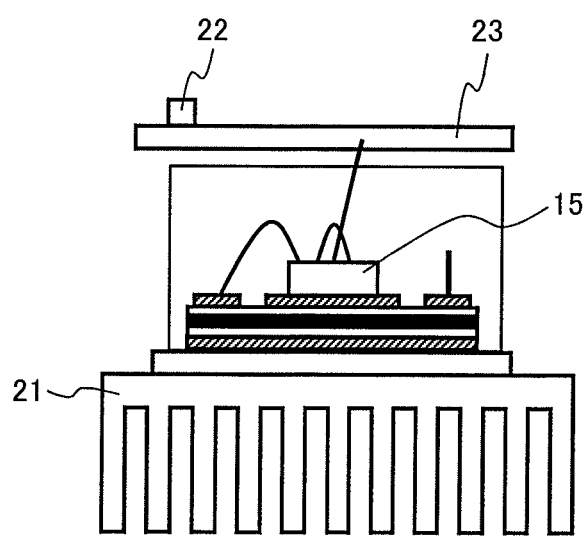
FIG. 14 is a third example of the placement of the temperature sensor in the first embodiment of the present invention.

FIG. 14 is a third example of the placement of the temperature sensor in the first embodiment of the present invention. In FIG. 14, the temperature sensor 22 is placed on a control substrate 23 on which a control and calculation unit 3 used to drive the element is mounted. Since, in this example, a wiring pattern on the printed substrate can be used to connect the temperature sensor 22, an advantageous effect of eliminating wires such as electric wires is obtained.

Figure 15:
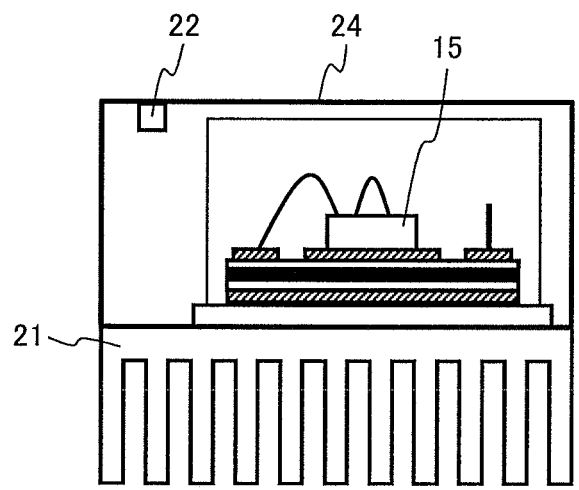
FIG. 15 is a fourth example of the placement of the temperature sensor in the first embodiment of the present invention.

FIG. 15 is a fourth example of the placement of the temperature sensor in the first embodiment of the present invention. In FIG. 15, the temperature sensor 22 is placed inside the case of the device. Since, in this example, the temperature sensor 22 can be placed in a space in the case, an advantageous effect of more freely placing the temperature sensor 22 is obtained. Particularly, if the cooling unit 21 has a large thermal capacity as with a cooling system, an adverse effect caused when heat is built up in the case can be lessened.

Figure 16:
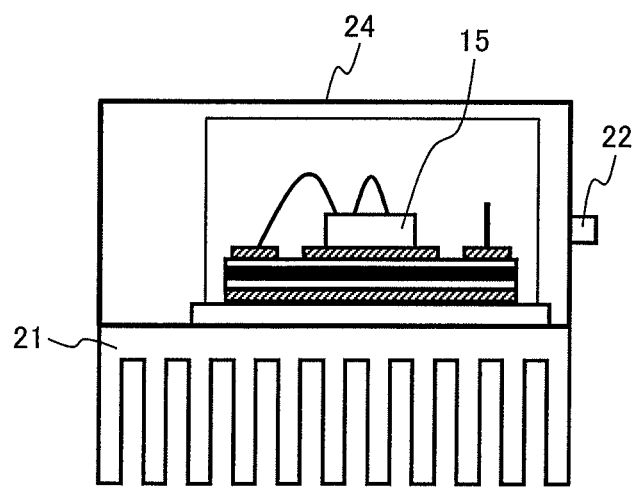
FIG. 16 is a fifth example of the placement of the temperature sensor in the first embodiment of the present invention.

FIG. 16 is a fifth example of the placement of the temperature sensor in the first embodiment of the present invention. In FIG. 16, the temperature sensor 22 is placed outside the case of the device. Since, in this example, there is no adverse effect that would be otherwise caused when heat is built up in the case, an advantageous effect of increasing precision in temperature calculation based on equation (18).

The positions at which the temperature sensor 22 is placed have been described with reference to FIGS. 12 to 16, and these placement positions are intended to calculate the absolute temperature of the chip in the module with respect to the ambient temperature outside the module. That is, even if, for example, a plurality of element modules are mounted, the number of temperature sensors may be smaller than the number of element modules, for example, a single temperature sensor is enough, so an advantageous effect of suppressing the embodiment from becoming complex is obtained.

Embodiment 2

Figure 17:
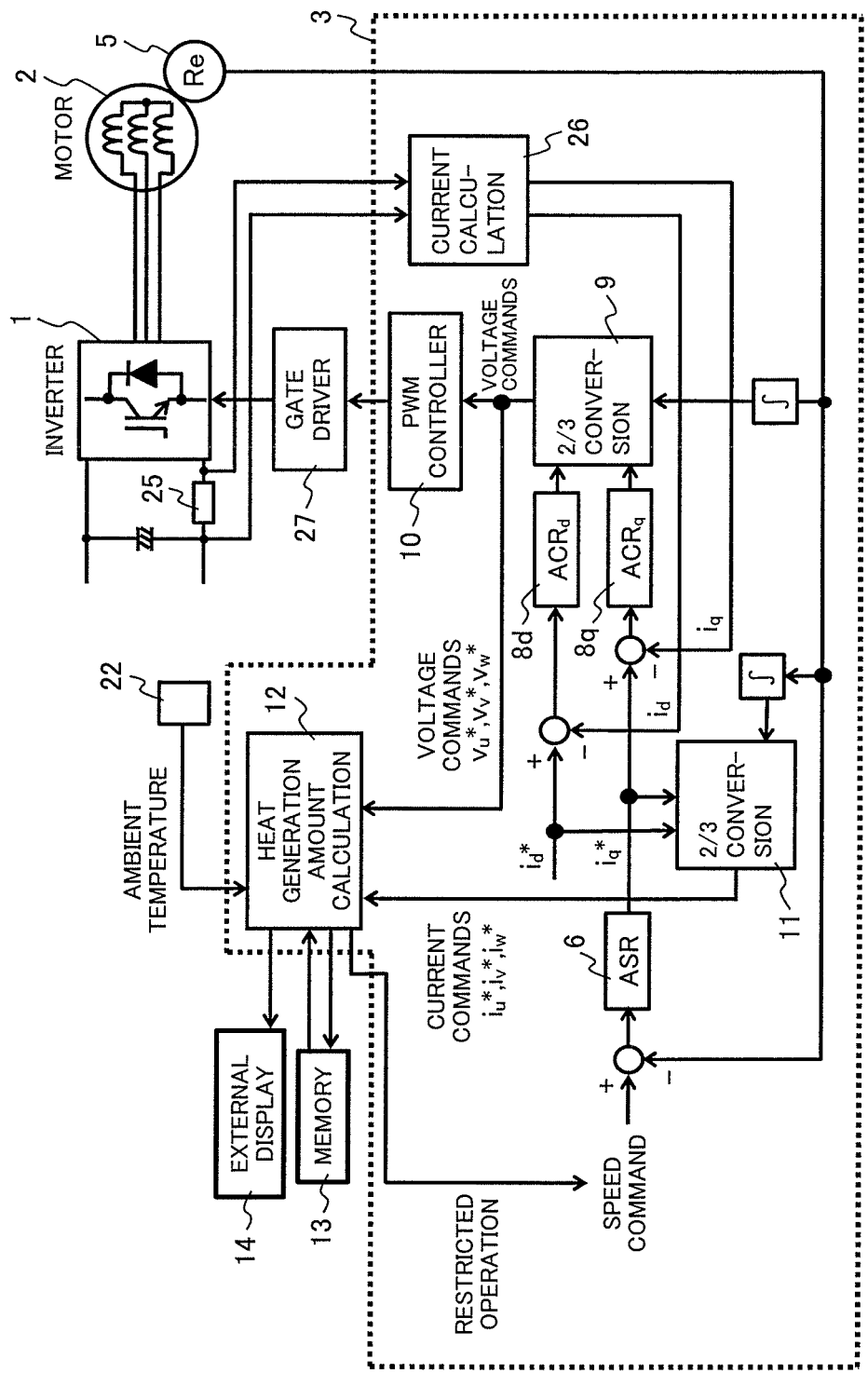
FIG. 17 schematically shows the entire structure of a power conversion device in a second embodiment of the present invention.

FIG. 17 schematically shows the entire structure of a power conversion device in a second embodiment of the present invention. The second embodiment relates to a method in which a current flowing in the motor 2 is estimated from a current flowing in a DC part without using the current sensor 4 in the first embodiment.

In this embodiment, the current flowing in the DC part is measured from a voltage generated across, for example, a shunt resistor 25, and field current id component and torque current iq component are derived by a current calculation unit 26 in the control and calculation unit 3. In the second embodiment as well, the command values id* and iq* for these currents are calculated. Accordingly, as in the first embodiment, the current command values iu*, iv* and iw* for currents flowing in the elements in all phases can be calculated by the current command 2-phase/3-phase converting unit 11. The voltage command value vu*, vv* or vw* can also be similarly calculated.

Accordingly, in the second embodiment as well, the amount of heat generated by the semiconductor switching element, which is part of the inverter, can be calculated in the heat generation amount calculation unit 12 by performing processing similar to the processing in the first embodiment, and the lifetime of the semiconductor switching element can be calculated.

The embodiments of the present invention have been described so far, though the present invention is not limited to the above embodiments. It will be appreciated that the present invention may be practiced in various other forms without departing from the spirit and scope of the invention.

REFERENCE SIGNS LIST

1: inverter main circuit, 2: motor, 3: control and calculation unit, 4: current sensor, 5: rotary encoder, 6: speed control system, 7: 3-phase/2-phase converter, 8d: d-axis current control system, 8q: q-axis current control system, 9: 2-phase/3-phase converter, 10: PWM controller, 11: current command 2-phase/3-phase converting unit, 12: heat generation amount calculation unit, 13: storage unit, 14: external display unit, 15: chip, 16: wire, 17: solder layer, 18: insulator, 19: conductor, 20: base plate, 21: cooling unit, 22: temperature sensor, 23: control substrate, 24: case, 25: shunt resistor, 26: current calculation unit, 27: gate driver.

What is claimed is:

1. A power conversion device having an inverter main circuit in which a switching element is mounted, a gate driver that drives the switching element, a PWM control unit that generates, based on a triangular wave carrier and a voltage command value, an ON/OFF control signal used to drive the switching element, and a control circuit that calculates the voltage command value, the power conversion device comprising:

a means for estimating a current value in each output phase from a current command value in each control cycle in which the switching element is controlled so that the switching element is turned on or off;

a means for calculating an ON loss and an OFF loss of the switching element as a function of the estimated current value;

a means for determining a switching element to be brought into conduction according to a polarity of the current command value;

a means for calculating, from the voltage command value in each output phase, a conduction time of the switching element in the each output phase in a control cycle;

a means for calculating a conduction loss of the switching element from the current value and the conduction time; and a means for calculating an amount of heat generated by the switching element from the ON loss and the OFF loss of the switching element and the conduction loss of the switching element.

2. The power conversion device according to claim 1, further comprising a storage means that stores the calculated amount of heat generated by the switching element, temperature information about temperature of the switching element, which is calculated from the amount of generated heat, or a deterioration state of the switching element, which is calculated from the temperature information.

3. The power conversion device according to claim 1, further comprising:

a means for determining that the calculated amount of heat generated by the switching element, temperature information about temperature of the switching element, which is calculated from the amount of generated heat, or a deterioration state of the switching element, which is calculated from the temperature information, has reached a prescribed state; and an external notification unit that indicates a warning when the prescribed state is reached.

4. The power conversion device according to claim 1, further comprising:

a means for calculating a remaining lifetime of the switching element from the calculated amount of heat generated by the switching element, temperature information about temperature of the switching element, which is calculated from the amount of generated heat, or a deterioration state of the switching element, which is calculated from the temperature information; and a means for displaying the calculated remaining lifetime of the switching element on an external display unit.

5. The power conversion device according to claim 1, further comprising a motor to which electric power is supplied from the inverter main circuit; wherein the control circuit has a speed command generating unit that generates a speed command value to be given to the motor and also has a speed control system that outputs the current command value according to the speed command value; and a means is provided that limits the speed command value when the calculated amount of heat generated by the switching element, the temperature information about the temperature of the switching element, which is calculated from the amount of generated heat, or the deterioration state of the switching element, which is calculated from the temperature information, reaches a prescribed state.

6. The power conversion device according to claim 1, wherein the means for calculating the amount of heat generated by the switching element is a means for performing a calculation for a chip or a soldered part in the switching element.

7. The power conversion device according to claim 1, further comprising:

a temperature sensor that acquires an ambient temperature; and a means for calculating the temperature of the switching element by adding an output of the temperature sensor to the amount of heat generated by the switching element.

8. The power conversion device according to claim 1, wherein the number of temperature sensors is smaller than or equal to the number of switching elements included in the inverter main circuit or smaller than or equal to a total number of chips in the switching elements; and a means is provided that calculates the temperature of the switching element by adding an output of the temperature sensor to the amount of heat generated by the switching element.

9. The power conversion device according to claim 1, further comprising:

a temperature sensor that is attached in a cooling unit for the switching element or on a base plate of the switching element, on a control substrate on which the control circuit is mounted, or in a case in which the switching element is included, and a means for calculating the temperature of the switching element by adding an output of the temperature sensor to the amount of heat generated by the switching element.

10. A power conversion device having an inverter main circuit in which a switching element is mounted, a gate driver that drives the switching element, a PWM control unit that generates, based on a triangular wave carrier and a voltage command value, an ON/OFF control signal used to drive the switching element, and a control circuit that calculates the voltage command value, the power conversion device comprising:

a means for estimating, in the control circuit, a current value in each output phase from a current command value in each control cycle in which the switching element is controlled so that the switching element is turned on or off;

a means for calculating an ON loss and an OFF loss of the switching element as a function of the estimated current value;

a means for determining a switching element to be brought into conduction according to a polarity of the current command value;

a means for calculating, from a ratio between a carrier amplitude and the voltage command value in each output phase, a conduction time of the switching element in the each output phase in a control cycle;

a means for calculating a conduction loss of the switching element from the current value, a saturation voltage, which is a function of the current value, and the conduction time; and a means for calculating an amount of heat generated by the switching element from the ON loss and the OFF loss of the switching element and the conduction loss of the switching element.

11. A method of calculating a temperature rise of a power conversion device that has an inverter main circuit in which a switching element is mounted, a gate driver that drives the switching element, a PWM control unit that generates, based on a triangular wave carrier and a voltage command value, an ON/OFF control signal used to drive the switching element, and a control circuit that calculates the voltage command value, the method comprising the steps of:
- estimating a current value in each output phase from a current command value in each control cycle in which the switching element is controlled so that the switching element is turned on or off;
- calculating an ON loss and an OFF loss of the switching element as a function of the current values;
- determining a switching element to be brought into conduction according to a polarity of the current command value;
- calculating, from the voltage command value in each output phase, a conduction time of the switching element in the each output phase in a control cycle;
- calculating a conduction loss of the switching element from the current value and the conduction time; and
- calculating an amount of heat generated by the switching element from the ON loss and the OFF loss of the switching element and the conduction loss of the switching element.

12. The method of calculating a temperature rise of a power conversion device according to claim 11, further comprising the storing step of storing the calculated amount of heat generated by the switching element, temperature information about temperature of the switching element, which is calculated from the amount of generated heat, or a deterioration state of the switching element, which is calculated from the temperature information.

13. The method of calculating a temperature rise of a power conversion device according to claim 12, further comprising the steps of:
- determining that the calculated amount of heat generated by the switching element, the temperature information about the temperature of the switching element, which is calculated from the amount of generated heat, or a deterioration state of the switching element, which is calculated from the temperature information, has reached a prescribed state; and
- indicating a warning with an external notification unit when the prescribed state is reached.

14. The method of calculating a temperature rise of a power conversion device according to claim 11, further comprising the steps of:
- calculating a remaining lifetime of the switching element from the calculated amount of heat generated by the switching element, temperature information about temperature of the switching element, which is calculated from the amount of generated heat, or a deterioration state of the switching element, which is calculated from the temperature information; and
- displaying the calculated remaining lifetime of the switching element on an external display unit.

15. The method of calculating a temperature rise of a power conversion device according to claim 11, further comprising a motor to which electric power is supplied from the inverter main circuit; wherein
- the control circuit has a speed command generating unit that generates speed command value to be given to the motor and also has a speed control system that outputs the current command value according to the speed command value; and
- a step is provided that limits the speed command value when the calculated amount of heat generated by the switching element, the temperature information about the temperature of the switching element, which is calculated from the amount of generated heat, or the deterioration state of the switching element, which is calculated from the temperature information, reaches a prescribed state.

16. A method of calculating a temperature rise of a power conversion device that has an inverter main circuit in which a switching element is mounted, a gate driver that drives the switching element, a PWM control unit that generates, based on a triangular wave carrier and a voltage command value, an ON/OFF control signal used to drive the switching element, and a control circuit that calculates the voltage command value, the method comprising the steps of:
- estimating, in the control circuit, a current value in each output phase from a current command value in each control cycle in which the switching element is controlled so that the switching element is turned on or off;
- calculating an ON loss and an OFF loss of the switching element as a function of the estimated current value;
- determining a switching element to be brought into conduction according to a polarity of the current command value;
- calculating, from a ratio between a carrier amplitude and the voltage command value in each output phase, a conduction time of the switching element in the each output phase in a control cycle;
- calculating a conduction loss of the switching element from the current value, a saturation voltage, which is a function of the current value, and the conduction time; and
- calculating an amount of heat generated by the switching element from the ON loss and the OFF loss of the switching element and the conduction loss of the switching element.

* * * * *